United States Patent

Ohzeki et al.

(10) Patent No.: US 6,700,730 B1
(45) Date of Patent: Mar. 2, 2004

(54) METHOD OF USING AN INTEGRAL PARAMETER FOR CORRECT PLACEMENT OF A READ/WRITE HEAD

(75) Inventors: Hideki Ohzeki, Kanagawa-ken (JP); Kenji Okada, Kanagawa-ken (JP); Koichi Takeuchi, Kanagawa-ken (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/856,767

(22) PCT Filed: May 10, 1999

(86) PCT No.: PCT/JP99/02422

§ 371 (c)(1),
(2), (4) Date: Jul. 16, 2001

(87) PCT Pub. No.: WO00/31738

PCT Pub. Date: Jun. 2, 2000

(30) Foreign Application Priority Data

Nov. 26, 1998 (JP) ............................................. 10/335824

(51) Int. Cl.[7] .............................................. G11B 5/596
(52) U.S. Cl. ................. 360/77.04; 360/78.09
(58) Field of Search ........................ 360/78.09, 78.08, 360/78.06, 78.14, 77.04, 77.01, 78.07, 77.06, 75

(56) References Cited

U.S. PATENT DOCUMENTS

| | | | | |
|---|---|---|---|---|
| 5,475,291 A | * | 12/1995 | Yoshida et al. | ........ 318/568.22 |
| 5,495,375 A | | 2/1996 | Baasch et al. | |
| 5,590,006 A | | 12/1996 | Shafe' | |
| 5,701,219 A | | 12/1997 | Shafe' | |
| 5,754,358 A | * | 5/1998 | Yatsu | ........ 360/78.09 |
| 5,768,064 A | | 6/1998 | Baasch et al. | |
| 5,956,201 A | * | 9/1999 | Pham et al. | ........ 360/78.09 |
| 6,023,390 A | * | 2/2000 | Kang | ........ 360/77.04 |
| 6,031,684 A | * | 2/2000 | Gregg | ........ 360/78.06 |
| 6,046,878 A | * | 4/2000 | Liu et al. | ........ 360/75 |
| 6,216,050 B1 | * | 4/2001 | Ono et al. | ........ 700/72 |
| 6,256,163 B1 | * | 7/2001 | Schmidt et al. | ........ 360/78.09 |
| 6,404,581 B1 | * | 6/2002 | Shah | ........ 360/75 |
| 6,437,936 B1 | * | 8/2002 | Chen et al. | ........ 360/77.04 |
| 6,457,587 B1 | * | 10/2002 | Conboy et al. | ........ 209/630 |
| 6,490,121 B1 | * | 12/2002 | Pruett et al. | ........ 360/78.09 |
| 6,563,666 B1 | * | 5/2003 | LaPanse | ........ 360/78.09 |
| 6,570,733 B1 | * | 5/2003 | Waugh et al. | ........ 360/78.06 |
| 6,574,070 B2 | * | 6/2003 | Gregg | ........ 360/78.09 |

FOREIGN PATENT DOCUMENTS

| | | |
|---|---|---|
| HU | 219 285 B | 9/1995 |
| HU | 216 850 B | 12/1995 |
| JP | 04123447 | 11/1993 |
| JP | 5-314687 A2 | 11/1993 |
| JP | 04163554 | 12/1993 |
| JP | 5-334817 | 12/1993 |
| JP | 05005457 | 8/1994 |
| JP | 6-215508 A2 | 8/1994 |
| JP | 06117773 | 12/1995 |
| JP | 7-326145 A2 | 12/1995 |
| WO | WO 00/31738 | 2/2000 |

* cited by examiner

Primary Examiner—David Hudspeth
Assistant Examiner—Fred F. Tzeng
(74) Attorney, Agent, or Firm—Abdy Raissinia; Bracewell & Patterson, L.L.P.

(57) ABSTRACT

To provide a disk drive, a manufacturing method thereof, and a disk-drive controller which are capable of improving yield without increasing costs so significantly. When track-following control is performed, HDC detects the current position of a read/write head, based on the reproduced output of a servo sector from a channel unit, and makes a calculation of servo data by employing both an integral parameter corresponding to a target track to be read onto a RAM and the detected current position of the read/write head.

20 Claims, 6 Drawing Sheets

METHOD OF USING AN INTEGRAL PARAMETER FOR CORRECT PLACEMENT OF A READ/WRITE HEAD

TECHNICAL FIELD

The present invention relates to a disk drive, a fabrication method thereof, and a disk-drive controller.

DESCRIPTION OF THE RELATED ART

Figure 2:
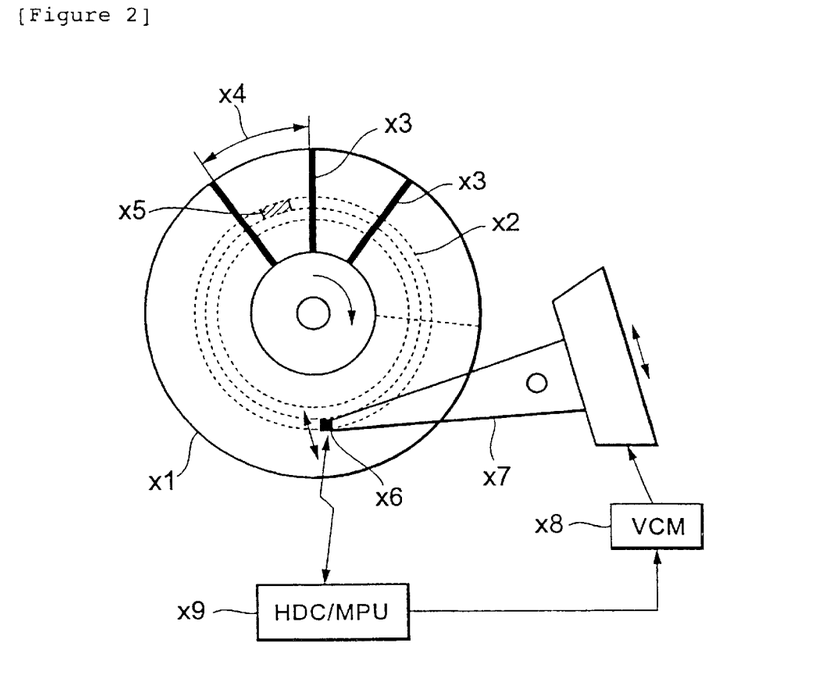
FIG. 2 is a block diagram showing the construction of a conventional disk drive.

Concentric, circular recording tracks X2 are formed on the recording surface of a magnetic disk X1 that is employed as a storage medium in a disk drive, as illustrated in FIG. 2. The recording surface is also provided at each predetermined angle (e.g., 360°/80, or 45°) with a servo area X3 on which a servo sector that, includes a servo pattern and an ID number, etc., is recorded. Between adjacent servo areas X3, the recording surface is further provided with a data area X4 on which a data sector X5 is recorded. Also, in some disk drives, this data area X4 is segmented into several zones in the radial direction of the magnetic disk X1. For each data zone, the number of data sectors X5 is optimized in accordance with the radial position of the zone in order to make the recording densities on the data zones uniform.

Figure 3:
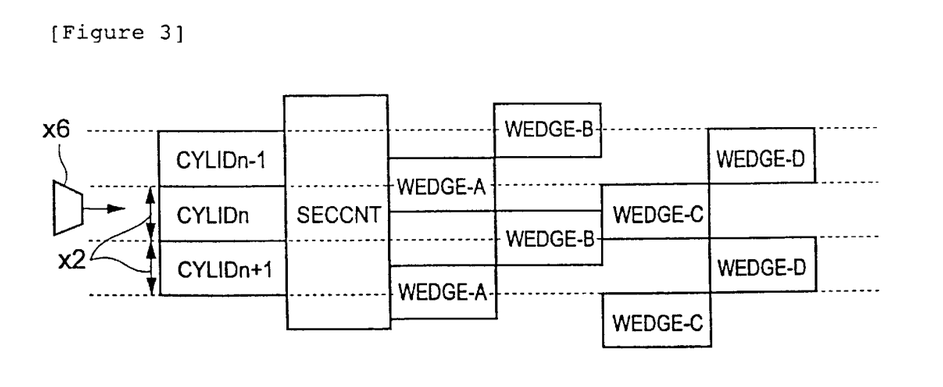
FIG. 3 is a diagram showing an example of the format of a servo sector employed in the disk drive.

In addition, a servo pattern (which consists of WEDGE-A, WEDGE-B, WEDGE-C, and WEDGE-D) and an ID number (CYLID) are recorded on the servo area X3, as shown in FIG. 3. If a read/write head X6 passes over the servo pattern and ID number, the outputs of the servo pattern and ID number reproduced by the read/write head X6 are supplied to a HDC/MPU X9. If these reproduced outputs are supplied, the HDC/MPU X9 calculates the current position of the read/write head X6, based on these outputs.

In a disk drive such as this, if the data sector X5 is specified and recording/reproduction is instructed, seek control is performed so that the read/write head X6 is moved to a target track on which the specified data sector has been recorded. After the read/write head X6 has reached the target track, a track-following control of adjusting the position of the read/write head X6 is performed so that the read/write head X6 follows the target track. In this manner, recording/reproduction is performed on the specified data sector.

The HDC/MPU X9 calculates an error (i.e., position error) between the target track and the current position of the read/write head X6 based on the reproduced output of the above-mentioned servo pattern. Furthermore, the HDC/MPU X9 executes control in accordance with the position error.

If the target track is specified, the HDC/MPU X9 first executes a control of accelerating the read/write head X6 toward the target data sector. Then, if the moving speed of the read/write head X6 has reached a predetermined maximum speed, the HDC/MPU X9 executes a control for moving the read/write head X6 at a constant speed. Finally, if the read/write head X6 has arrived near the target data sector, the HDC/MPU X9 executes a control of decelerating the read/write head X6 (settling control).

If the read/write head X6 reaches the target track, the HDC/MPU X9 switches the settling control to the track-following control of causing the read/write head X6 to follow the target track. The switching of these controls is performed by changing an arithmetic parameters that calculate servo data.

The seek control and the track-following control are executed by calculating servo data that is used for driving a voice coil motor (VCM) X8 that moves a head arm X7. The servo data is calculated based on the position error by the HDC/MPU X9.

Specifically, the calculation of this servo data is executed according to the following Equation (1), which includes an integral parameter I from the standpoint of the stability of control.

$$U(t)=K1 \times X(t)+K2 \times [X(t)-X(t-1)]+K3 \times U(t-1)+K4 \times U(t-2)+K5 \times I+C \quad (1)$$

Since it is becoming necessary to perform servo control at high speeds and with a high degree of accuracy (dynamic range) in recent years, accuracy in the above-mentioned calculation of the integral parameter is also increasingly being demanded. As a result, there are cases where the integral parameter will exceed the accuracy of arithmetic means' control equipped in the HDC/MPU X9.

If the calculation accuracy of the integral parameter exceeds the accuracy of the arithmetic means' control, an accurate calculation of servo data cannot any longer be made. As a result, the track-following control to a target track cannot any longer be performed and recording/reproduction of data becomes impossible.

Also, if the calculation accuracy of the integral parameter exceeds the accuracy of the arithmetic means during manufacturing test process, the disk drive will then be considered to be defective and reduce yield.

In addition, in order to realize the calculation accuracy required, it is also possible that the enhancement of calculation accuracy of an arithmetic unit equipped in the HDC/MPU X9 adding or separate arithmetic means such as DSP. Accuracy of an arithmetic unit equipped in the HDC/MPU X9 or DSP, however, is discrete like next unit of 16 bits is 32 bits, resulting in too much increase in cost.

The present invention has been made in view of the above-mentioned problems. Accordingly, it is an object of the present invention to provide a disk drive, a manufacturing test method thereof, and a disk-drive controller which are capable of improving yield without increasing costs (to more than necessity).

SUMMARY OF THE INVENTION

To solve the above-mentioned problems, the disk drive according to the present invention is characterized comprising:

a disk storage medium with a servo area on which a servo sector is recorded and a data area on which a data sector is recorded;

recording/reproducing means for performing reproduction of said servo sector of said disk storage medium and recording or reproduction of said data sector;

drive means for driving a position of said recording/reproducing means;

position detection means for extracting position information indicating the position of said recording/reproducing means from output of said servo sector reproduced by said recording/reproducing means;

holding means for holding an integral parameter in accordance with a position on said disk storage medium;

arithmetic means for calculating data for driving said drive means, based on said position information detected by said position detection means and said integral parameter in accordance with said position information; and correction means for setting said integral parameter in accordance with calculation accuracy of said arithmetic means and correcting the calculation made by said arithmetic means.

Also, the disk drive may be provided with:

seeking-error detection means for detecting that a seek operation of moving said recording/reproducing means to a target position in accordance with a result of the calculation made by said arithmetic means has failed; and reset means for setting said integral parameter again when failure of said seek operation is detected by said seeking-error detection means.

In addition, a disk-drive manufacturing test method according to the present invention is characterized comprising the steps of:

moving said recording/reproducing means to all radial positions on said disk storage medium which are employed in recording and then calculating an integral parameter at each radial position; and adjusting said integral parameter to a value within the calculation accuracy of said arithmetic means when said integral parameter exceeds the calculation dynamic range of said arithmetic means.

DETAILED DESCRIPTION OF THE PREFERRED EMBODIMENT

Figure 1:
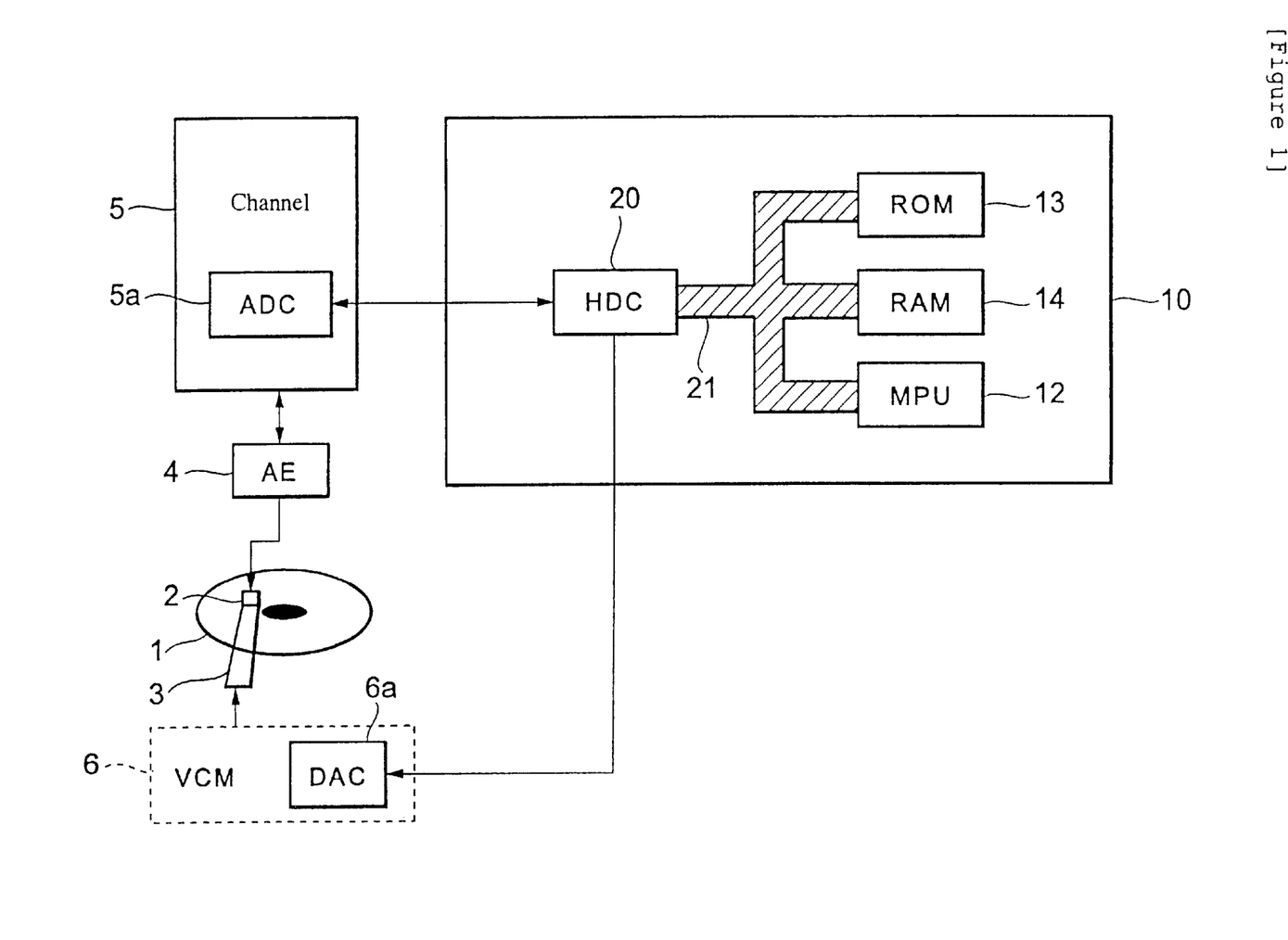
FIG. 1 is a perspective diagram showing the construction of a disk drive according to an embodiment of the present invention.

FIG. 1 is a perspective diagram showing the construction of a disk drive according to a first embodiment of the present invention. This disk drive is equipped with a magnetic disk 1, a read/write head 2 for performing recording/reproduction on the magnetic disk 1, a head arm 3 having the read/write head 2 attached thereto, an arm electronic (AE) circuit 4 arranged near the read/write head 2 for supplying a signal to be recorded to the read/write head 2 and picking up (amplifying) output reproduced from the read/write head 2, a channel unit 5 for performing the extraction and conversion (coding) of a servo pattern and a cylinder ID number (CYLID) from the reproduced output supplied through the AE circuit 4, a control IC 10 for performing servo control and controlling recording/reproduction with respect to the magnetic disk 1, and a voice coil motor (VCM) drive section 6 for driving a VCM that makes the head arm 3 move.

The control IC 10 is equipped with an MPU 12 for controlling operation of the overall system, a ROM 13 in which control programs and the like are stored, a RAM 14 employed to store control data, data to be recorded, and reproduced data, and a hard-disk controller (HDC) 20 for forming a servo signal. The MPU 12, ROM 13, RAM 14, and HDC 20 are interconnected by a bus 21. The control IC 10 is constructed, for example, as a single semiconductor device.

Figure 4:
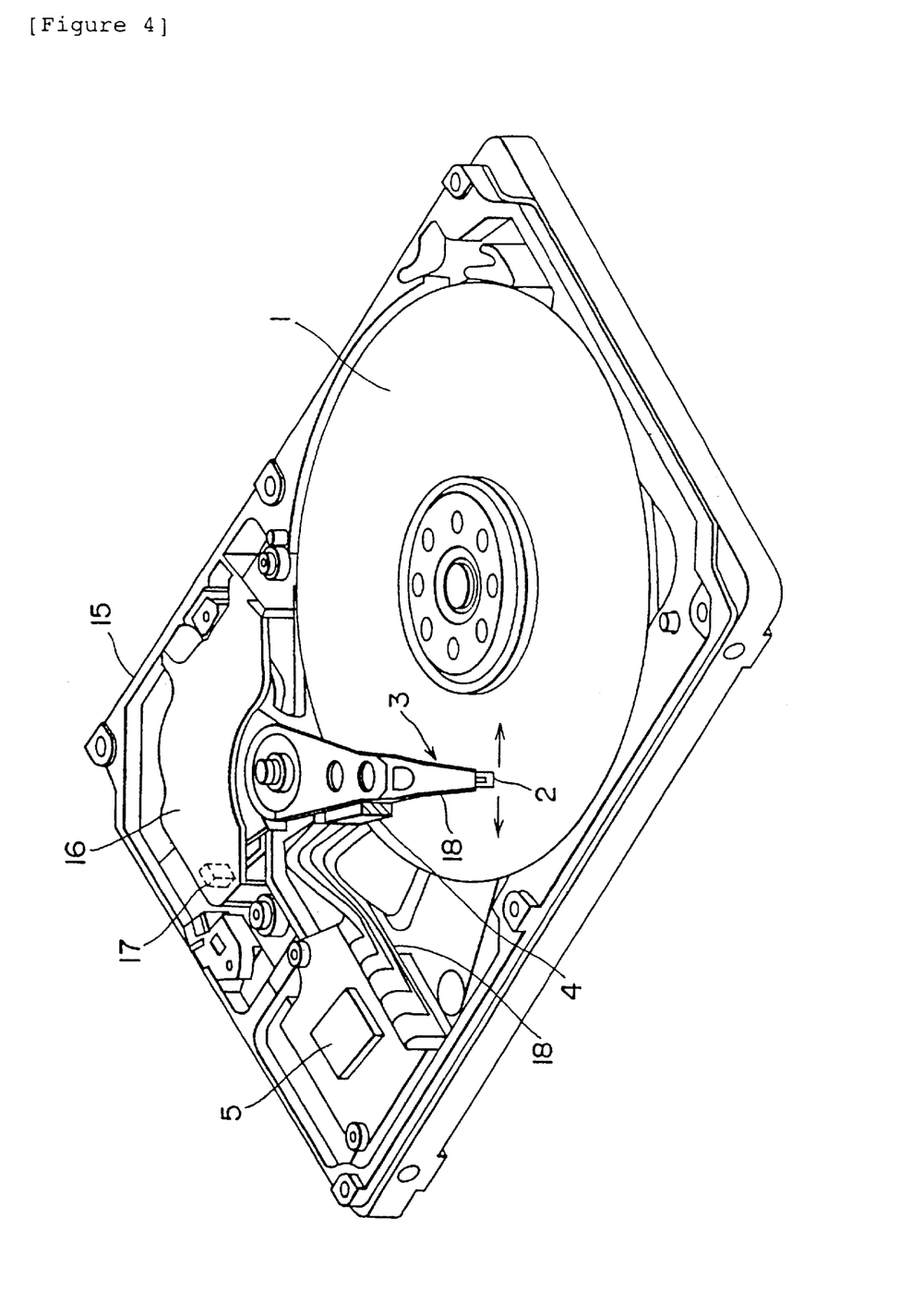
FIG. 4 is a perspective diagram showing the detailed construction of the disk drive according to the embodiment of the present invention.

FIG. 4 is a perspective diagram showing the specific construction of this disk drive. The magnetic disk 1 is attached to a chassis 15 so that it can freely rotate. The head arm 3, which drives a head slider having the read/write head 2 mounted thereon, is attached so that the read/write head 2 can move in approximately the radial direction of the magnetic disk 1, and is driven by a VCM 16.

Also, the head arm 3 is constructed so that during non-operation, rotation of the read/write head 2 is limited by a magnet 17 at a position opposed to a landing zone provided on the inner circumferential side of the magnetic disk 1.

The above-mentioned AE circuit 4 is attached to the side surface of the head arm 3 for noise reduction and is connected to the read/write head 2 and the channel unit 5 by a flexible cable 18.

Also, the above-mentioned control IC 10 is mounted on a control board (not shown) attached outside the chassis 15. The control IC 10 penetrates the chassis 15 and is connected by the flexible cable 18.

The recording surface of the magnetic disk 1, as with the magnetic disk shown in FIG. 2, is concentrically formed with circular tracks X2 with a predetermined width. The recording surface is also provided at each predetermined angle (e.g., 360°/80, or 45°) with a servo area, on which a servo pattern X3 is recorded. A data sector X5 is recorded on the data area X4 between adjacent servo areas X3 on each track X2. Note that recording densities may be made uniform, by segmenting this data area X4 into several zones radially and recording the optimized number of data sectors X5 for each zone in accordance with the radial position of the zone.

For each servo sector X3, as with FIG. 3, a cylinder ID number (CYLID) indicating a track number, a physical sector number (SECCNT) indicating a servo pattern number, a burst pattern of WEDGE-A, WEDGE-B, WEDGE-C, and WEDGE-D for controlling a tracking (following) operation, etc. are encoded and recorded by encoding methods suitable for respective recording/reproduction.

The cylinder ID number (CYLID) is recorded by special notation called a gray code. The gray code does not follow a normal binary count sequence. The gray code is defined so that each time a value increases by 1, only 1 bit in the gray code changes. With this notation, whether or not the read/write head is moved between CYLIDn and CYLIDn−1, either value will always be obtained. Also, the physical sector number (SECCNT) is a number for identifying each servo pattern. Since this number does not depend on a position in the radial direction, it is recorded by a normal binary count sequence. The channel unit 5 reproduces CYLID and SECCNT by decoding methods corresponding to these encoding methods and supplies the reproduced CYLID and SECCNT to the control IC 10.

The burst pattern, which consists of WEDGE-A, WEDGE-B, WEDGE-C, and WEDGE-D, is recorded in order to detect a detailed position on the track, remove indeterminacy of CYLID such as the aforementioned, and determine which of adjacent tracks the read/write head is located over. The burst pattern has a pitch equal to half the track width with two tracks as 1 cycle. That is, the WEDGE-A, WEDGE-B, WEDGE-C, and WEDGE-D in the burst pattern are arranged and recorded so that their radial positions differ from each other by half the track width.

If the read/write head 2 passes over the tracks constructed as described above, the reproduced outputs of the read/write head 2 are obtained in order of CYLID, SECCNT, WEDGE-A, WEDGE-B, WEDGE-C, and WEDGE-D. The reproduced levels of WEDGE-A, WEDGE-B, WEDGE-C, and WEDGE-D change according to a position of the read/write head 2.

The channel unit 5 is equipped with an analog/digital converter (ADC) 5a, which serially converts the reproduced analog levels of WEDGE-A, WEDGE-B, WEDGE-C, and WEDGE-D to digital signals and outputs them as data A, B, C, and D indicating the respective reproduced levels.

The HDC 20 executes servo control, such as generation of a control signal with respect to the channel unit 5, retrieval of the servo pattern, generation of CYLID from the reproduced output of the gray code and the like. The HDC 20 also executes drive control based on control from the MPU 12, detection of the current position of the read/write head 2 based on the data A, B, C, and D indicating the respective reproduced levels of WEDGE-A, WEDGE-B, WEDGE-C, and WEDGE-D supplied from the ADC 5a as described above, the seek operation of moving the read/write head 2 to a target track, the track-following control of causing the read/write head 2 to follow a target track, and so on.

The MPU 12 implements commands input from external equipment, input/output control of data, an exceptional process that cannot be processed by the HDC 20, etc., by carrying out the control programs stored in the ROM 13, for example.

The operation of the disk drive according to this embodiment of the present invention will hereinafter be described in detail.

In the disk drive constructed as described above, if a logic block address (LBA) is specified by external equipment and recording or reproduction is instructed, a target track, a target sector, etc. are calculated from the specified LBA.

Figure 5:
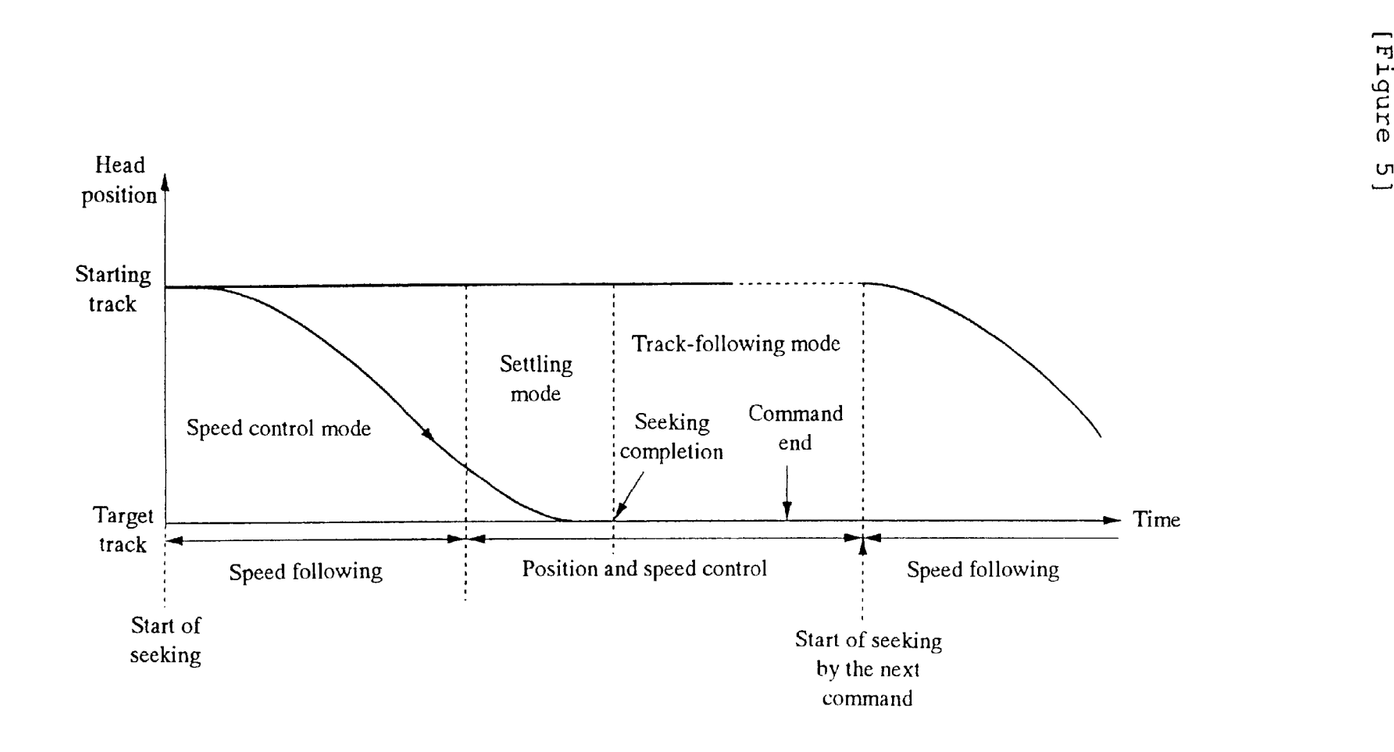
FIG. 5 is a diagram showing the operational modes in the seek operation of the disk drive.

If the target track is calculated, the HDC 20 first executes the control of accelerating the read/write head 2 toward the target sector, as shown in FIG. 5. Then, if the moving speed of the read/write head 2 has reached a predetermined maximum speed, the HDC 20 executes the control for moving the read/write head 2 at a constant speed. (The mode of performing a sequence of these speed controls will hereinafter be referred to as a speed control mode.) Furthermore, if the read/write head 2 has arrived near the target track, the HDC 20 executes the control of decelerating the read/write head 2. (The mode of performing such a control will hereinafter be referred to as a settling mode.) Next, if the read/write head 2 reaches the target track, the HDC 20 performs the control of making the read/write head 2 follow the target track. (The mode of performing control such as this will hereinafter be referred to as a track-following mode.)

If the above-mentioned CYLID and the data A, B, C, and D indicating the reproduced levels of WEDGE-A, WEDGE-B, WEDGE-C, and WEDGE-D are supplied from the channel unit 5, the HDC 20 calculates the current position of the read/write head 2 and also calculates the position error signal (PES) between the current position of the read/write head 2 and the target track that was calculated as described above.

The HDC 20 selects any of the above-mentioned modes in accordance with a value of this PES and makes a calculation of servo data in accordance with the selected mode.

The calculation for obtaining this servo data (U(t)) is made according to the following Equation (1), for example.

$$U(t)=K1 \times X(t)+K2 \times [X(t)-X(t-1)]+K3 \times U(t-1)+K4 \times U(t-2)+K5 \times I+C \quad (1)$$

where X(t) in the first term on the right-hand side is equivalent to a distance from the target track, i.e., the aforementioned PES and X(t)−X(t−1) in the second term on the right-hand side represents a time change of PES, i.e., speed of the read/write head 2. Also, I in the fifth term on the right-hand side represents an integral parameter (i.e., summation of X(t) (an integrated value in the case where X(t) is an integral variable)). C in the sixth term on the right-hand side is a constant; K1, K2, K3, K4, and K5 are feedback gains, which are determined in consideration of the gain of control, stability, etc.

Also, since X(t) becomes zero in a steady state, Equation (1) becomes:

$$U(t)=K3 \times U+K4 \times U+K5 \times I+C$$

Furthermore, $$(1-K3-K4) \times U=K5 \times I+C$$

$$U=[K5/(1-K3-K4)] \times I+C' \quad (2)$$

Figure 6:
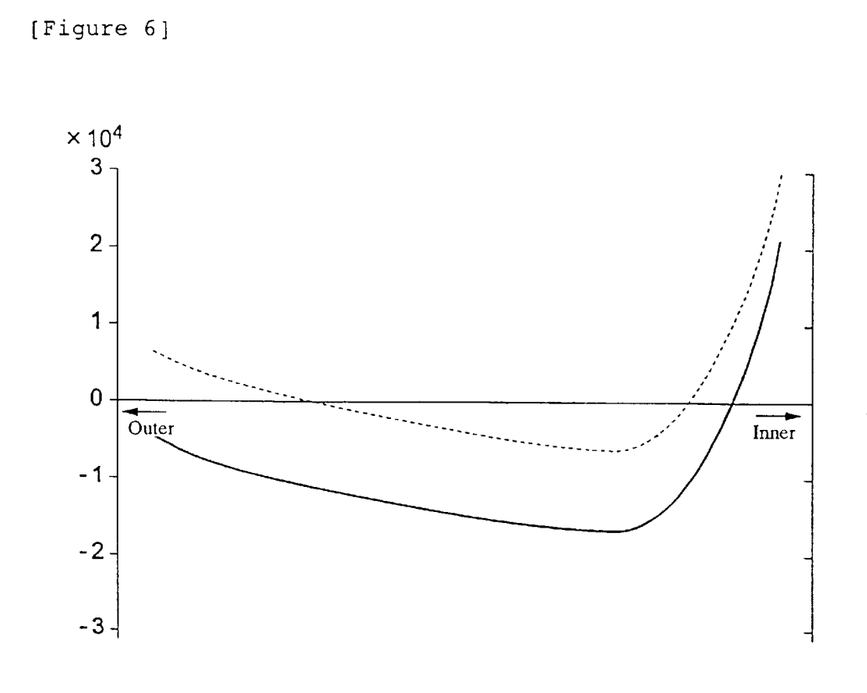
FIG. 6 is a diagram showing an example of an integral parameter employed to calculate servo data in the disk drive.

Also, the integral parameter I is a parameter for adjusting a dc bias current which is supplied to the VCM in holding the position of the read/write head 2 in a certain track. For each disk drive, when the read/write head 2 is forced to follow each track, the optimal value at that time is actually measured and determined during manufacturing test process. FIG. 6 illustrates an example of the integral parameter I experimentally measured.

Figure 7:
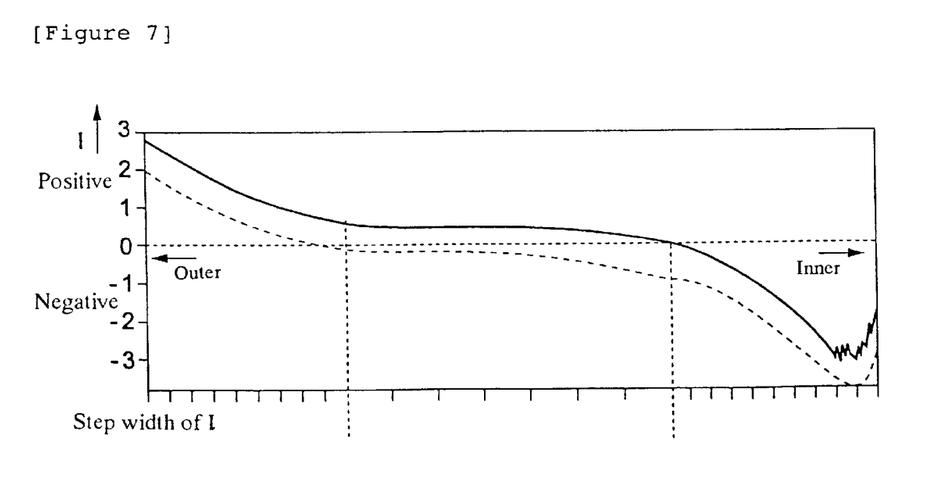
FIG. 7 is a diagram showing another example of the integral parameter.

Here, the left side in FIG. 6 indicates the outer circumferential side of the magnetic disk 1, while the right side indicates the inner circumferential side. A value of this integral parameter I is varied, for example, by an interaction with the above-mentioned magnet 17, the elasticity of the flexible cable 18, the flow of air the head slider undergoes, etc. For this reason, the value of the integral parameter I differs between disk drives structurally differing in the number of disks, the number of read/write heads, etc. Also, even if the structures were the same, the value of the integral parameter I will differ from disk drive to disk drive because of variations in the components. For instance, in other disk drives, there are cases where values of I become negative at the inner circumferential side of the magnetic disk 1, as shown in FIG. 7.

Also, if the value of the integral parameter I exceeds the calculation accuracy of the HDC, the adjustment of the dc bias of current that is supplied to the VCM cannot be made, and consequently, the track-following control of making the read/write head 2 follow a target track cannot any longer be performed.

The value of the integral parameter I, therefore, is limited by the calculation accuracy of the HDC. For instance, in the case of an accuracy of 16 bits, the integral parameter I is limited to a value from 8000h (where h is a hexadecimal number) to 7FFFh (−32768 to 32767). Furthermore, considering room for adjustment, the value of the integral parameter I in this case is limited to about −25000 to 25000.

For this reason, if the integral parameter I has a characteristic such as that shown by a solid line in FIG. 6, for example, in all tracks the values of I are within the calculation dynamic range of the HDC 20. As a result, in all tracks the adjustment of the dc bias current that is supplied to the VCM can be made. In contrast to this, in the case of a characteristic such as the one shown by a broken line in FIG. 6, for example, the value of I exceeds the upper limit of the calculation range of the HDC 20 at the inner circumferential side of the magnetic disk 1. For this reason, the adjustment of the dc bias current cannot be made at tracks on the inner circumferential side. A disk drive such as this has been considered to be defective and has reduced yield.

In contrast to this, in the disk drive according to this embodiment, when the value of the integral parameter I exceeds a predetermined dynamic range as in the case shown by the broken line in FIG. 6, the value of the integral parameter I is given an offset quantity so that it is within values the integral parameter I can take. Also, only giving an offset quantity simply to the value of I will change the value of servo data calculated by Equation (2). For this reason, an adjustment to the value of the integral parameter I is made by constant C.

In addition, if the value of the integral value I is present near the boundary of the above-mentioned dynamic range of the values the integral parameter I can take, a possibility of the value exceeding the dynamic range because of an external disturbance or the like is also considered. For this reason, it is desirable that the value of the integral value I be located in the central part of the range of values the integral value I can take. It is more desirable to have a certain degree of room.

Incidentally, in order to put the accuracy of calculation within a given range, changing the gains (K3, K4, and K5) in the above-mentioned Equation (2) is also considered, but since these parameters are generally determined so that the servo characteristic is optimum, the servo characteristic will be degraded if the gains are changed at random.

Therefore, the disk drive according to this embodiment gives the value of the integral parameter I an offset quantity and sets a value of constant C, thereby preventing degradation of the servo characteristic.

For the above-mentioned constant C, during the manufacturing test process, the above-mentioned characteristic of the integral parameter I such as that shown in FIG. 6 is calculated for all tracks, and the constant C is determined so that in all tracks, the values of I are within a predetermined range.

Figure 8:
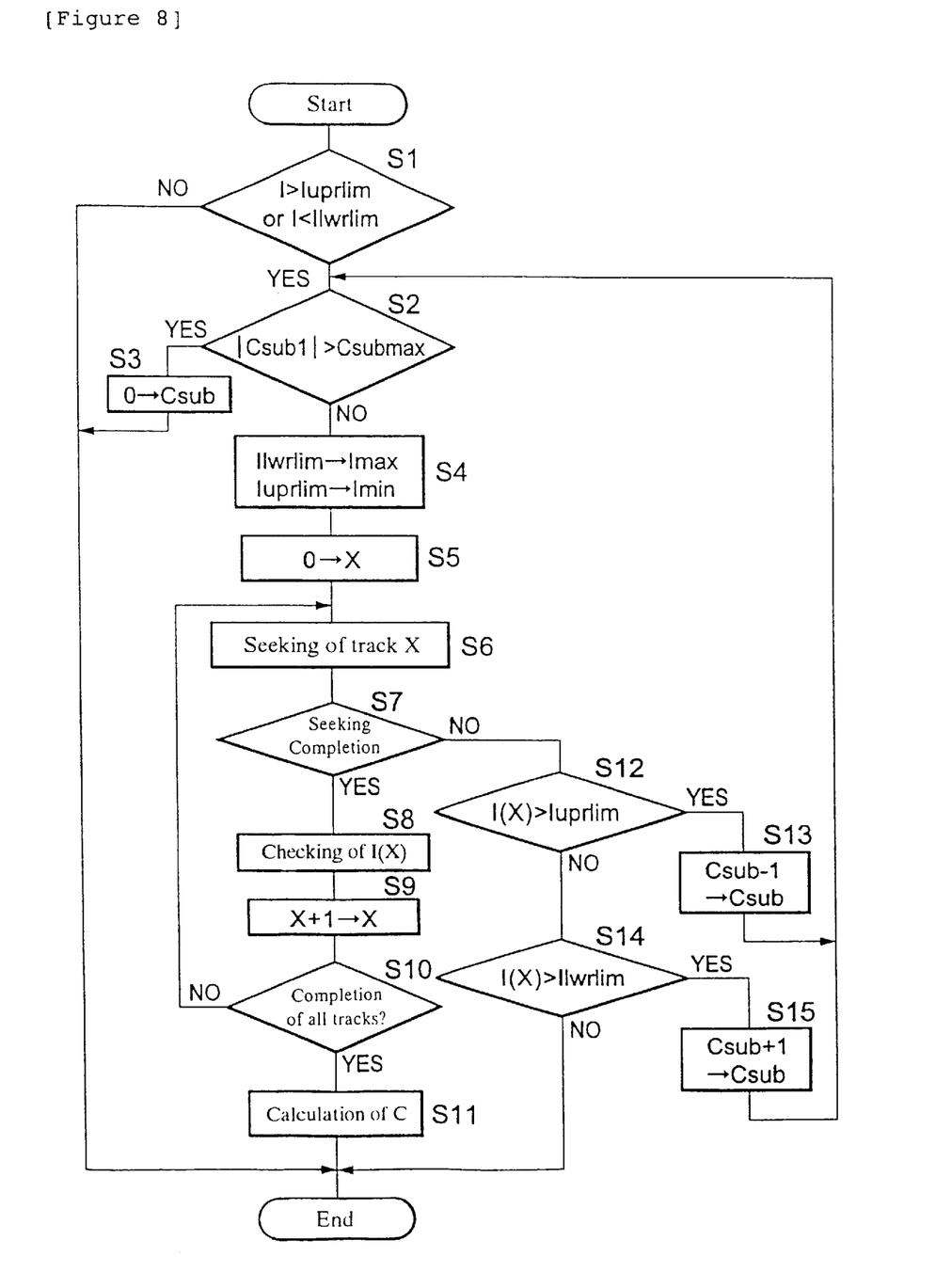
FIG. 8 is a flowchart showing a process of adjusting the integral parameter.

Specifically, the process of determining the values of the integral parameter I and constant C is carried out according to the flowchart shown in FIG. 8.

First, during the manufacturing test process, when the read/write head is caused to follow each track, the integral parameter I at that time is actually measured for each disk drive.

Thereafter, the execution of the process is started at step S1.

Note that the minimum value Ilwrilm (8000h for the above-mentioned case) and maximum value Iuprlim (7FFFh for the above-mentioned case) of the integral parameter I are previously set. Also, as the initial state, the above-mentioned constant C and variable Csub are set to zero.

First, in step S1, it is decided whether or not the value of the integral parameter I at any track position exceeds the range of values the integral parameter I can take.

In the case where it exceeds the range, the process advances to step S2 because the aforementioned setting of the values of the integral parameter I and constant C becomes necessary. In the case where it is not outside the range, the process is ended because the values of the integral parameter I at all track positions are within the range of values the integral parameter I can take.

In step S2 it is decided whether or not the absolute value of variable Csub is greater than the maximum value Csubmax the variable Csub can take. In the case where it is greater than the maximum value Csubmax, the process advances to step S3 because the integral parameter I cannot be adjusted so as to be within a predetermined range. In step S3 the process ends with the variable Csub as 0.

In the case where the absolute value of variable Csub is less than the maximum value Csubmax (upper limit of the number of retries), the process advances to step S4. In step S4, variable Imax for detecting the maximum value of the integral parameter I is set to the minimum value Ilwrlim of the values the integral parameter I can take, and variable Imin for detecting the minimum value of the integral parameter I is set to the maximum value Iuprlim of the values the integral parameter I can take. Then, the process advances to step S5.

In step S5 variable X for counting tracks is cleared and the process advances to step S6. In step S6 the read/write head is moved to track X (this is called a seek operation) and the process advances to step S7.

In step S7 it is decided whether or not the seek operation has ended normally. If it has ended normally, the process advances to step S8. In step S8 the value of I(X) at that time is checked. In the checking operation, when the value of I(X) is greater than Imax, which keeps the maximum value of the integral parameter I up to that time, I(X) is set to the Imax. On the other hand, when the value of I(X) is less than Imin, which keep the minimum value of the integral parameter I up to that time, I(X) is set to the Imin. If the aforementioned checking operation ends, the process advances to step S9.

In step S9 the value of variable X is incremented by 1 and the process advances to step S10. In step S10 it is detected whether or not the process from step S6 to step S9 has ended for all tracks. If the process has not ended for all tracks, it returns to step S6 and is reiterated (repeated) from step S6 to step S9. With this, the seek operation is serially performed for all tracks and it is decided whether or not the seek operation has been completed normally. Also, if the process has ended for all tracks, it advances to step S11. In step S11 the value of constant C is calculated and the process ends. In this manner, the value of the integral parameter I is adjusted so as to be within the range of values it can take, and the value of constant C is determined according to the adjusted value of the integral parameter I.

On the other hand, in step S7, if the seek operation has not ended normally, the process advances to step S12. In step S12 it is decided whether or not the value of I(X) is greater than the maximum value Iuprlim of the values the I(X) can take. If it is greater than the maximum value, the process advances to step S13. In step S13, 1 is subtracted from variable Csub, and the process returns to step S2. On the other hand, if I(X) is not greater than the maximum value, the process advances to step S14. In step S14 it is decided whether or not the value of I(X) is less than the minimum value Ilwrlim of the values the I(X) can take. If it is less than the minimum value, the process advances to step S15. In step S15, 1 is added to variable Csub, and the process returns to step S2. If it is not less than the minimum value, the process is ended because it is considered that the seek operation has not ended due to reasons other than the value of I(X).

In this manner, the above-mentioned process is repeated by a predetermined number of times. Nevertheless, when the seek operation is not recovered normally, the above-mentioned steps S2 and S3 are carried out and the process is ended.

Incidentally, as shown in FIGS. 6 and 7, the value of the integral parameter I differs from track to track. For this reason, if all the values of the integral parameter I are to be held, a considerably large storage (memory) area must be ensured on the above-mentioned ROM 13 or magnetic disk 1.

Or, using the same value approximately for a predetermined number of tracks is also considered. However, as shown in the above-mentioned FIGS. 6 and 7, a change in the value of the integral parameter I is not uniform with respect to the tracks. As a result, keeping the accuracy in the value of the integral parameter I and a reduction of a required memory area (in the storage capacity) are incompatible.

For this reason, in this disk drive, within steps consisting of a predetermined number of tracks the same value of the integral parameter I is used. For instance, as shown in FIG. 7, the step widths of the integral parameter I are reduced for an area with a great change in the value of the integral parameter I and are increased for an area with a small change in the value of the integral parameter I.

The discrete values of the integral parameter I are recorded on the ROM 13 the recording surface of the magnetic disk 1 as a table showing track numbers that indicate a range of the step of the integral parameter I and also showing the values of the integral parameter I provided in the steps.

The HDC 20 calculates a value of the integral parameter I in accordance with the current track position in reference to this table and calculates servo data, based on the aforementioned Equation (1) or (2).

Thus, accuracy in the value of the integral parameter I and a reduction of a required memory area are compatible, by using the values of the integral parameter I as the same value at predetermined steps and varying the step width in accordance with a change in the value of the integral parameter I.

Also, while it has been described that the adjustment to the value of the integral parameter I and the setting of constant C are performed during the manufacturing test process, the value of the integral parameter I also varies according to operating environments such as surrounding temperature and the like.

For this reason, in the case where an error occurred in the seek operation during use of the disk drive, for example, the above-mentioned process shown in FIG. 5 may be executed in order to optimize the values of the integral parameter I and constant C as well.

Since the values of the integral parameter I and constant C also have an influence upon the characteristic of the seek operation, the optimization in accordance with operating environments can enhance the characteristic of the seek operation and make a contribution to an improvement of the performance of the disk drive.

Note that the present invention is not to be limited to the above-mentioned embodiment, but may be modified within the scope of the present invention.

INDUSTRIAL APPLICABILITY

In the present invention, the correction means sets the integral parameter held in the holding means in accordance with the calculation accuracy of the arithmetic means and corrects a calculation made by the arithmetic means. The present invention, therefore, can utilize a disk drive that was considered to be defective because the accuracy of the integral parameter exceeds the calculation accuracy of the arithmetic means. For this reason, the present invention can improve yield without increasing costs so significantly.

In addition, if the seek operation of moving the recording/reproducing means to a target position fails, the integral parameter can be reset by the reset means. Therefore, even in the case where the characteristic of the integral parameter is varied by a change in operating environments, the value of the integral parameter can be held in an appropriate range. With this, the recording/reproducing characteristic can be maintained.

What is claimed is:

1. A method for enabling correct placement of a read-write head of a disk drive having a disk storage medium with a servo track and a data area, said method comprising:

calculating a series of values for an integral parameter to be utilized within a servo-positioning analysis that positions said read-write head during operation of said disk drive, wherein each value of said series of values represents a particular off-set for a respective servo track at which said value is calculated;

evaluating a respective offset constant that is added to said integral parameter when said value of said integral parameter falls outside of a particular range required to ensure that said servo positioning analysis provides a correct placement of said read-write head; and storing said integral parameter along with said respective offset constant, wherein said values are later retrieved and utilized to complete said servo-positioning analysis to enable substantially correct placement of said read-write head.

2. The method of claim 1, wherein said calculating step includes:

measuring said integral parameter for each servo track of said disk drive;

comparing said integral parameter to a predetermined range having a maximum value and a minimum value to determine whether said integral parameter exceeds said range at each track position of said disk drive; and determining said offset constant responsive to a condition in which said integral parameter falls outside of said range, wherein a value of said offset constant when summed with said integral parameter places said integral parameter within said range.

3. The method of claim 2, wherein said determining step further includes determining whether an absolute value of said offset constant is less than or equal to a pre-determined maximum value allowed for said offset constant.

4. The method of claim 3, wherein further, if said absolute value of said offset constant is greater than said predetermined maximum value, said method further comprises setting said value of said offset constant is to zero.

5. The method of claim 3, further comprising selecting a maximum value of said integral parameter and a minimum value of said integral parameter for utilization during operation of said disk drive, wherein said maximum and minimum values fall within said pre-determined range and provides a smaller range of values for said integral parameter.

6. The method of claim 5, further comprising recording said values of said integral parameter on a memory component of said disk drive.

7. A method of fabricating a disk drive having a disk storage medium with a servo area on which a servo sector is recorded and a data area on which a data sector is recorded, and recording/reproducing means for performing reproduction of said servo sector of said disk storage medium and recording or reproduction of said data sector, said method comprising:

moving said recording/reproducing means to all radial positions on said disk storage medium which are employed in recording;

calculating an integral parameter at each radial position; and adjusting said integral parameter to a value within the calculation accuracy of an arithmetic means utilized for calculating data for positioning said recording/reproducing head on said disk storage medium when said integral parameter has a value greater than the calculation accuracy of said arithmetic means.

8. The method of claim 7, wherein said adjusting step includes the step of determining an offset constant that is summed with said integral parameter to provide a result that is within the calculation accuracy of said arithmetic means.

9. The method of claim 8, further comprising storing said integral parameter and said offset constant for later utilization within a positioning logic that determines a correct position of said recording/repositioning mechanism during operation of said disk drive.

10. A disk drive comprising:

a storage medium with a servo area and a data area on which a servo sector and a data sector are recorded, respectively;

a drive mechanism for selectively positioning a read/write head on said storage medium;

a hard disk controller (HDC) with position detection logic that extracts position information of said read/write head on said disk storage medium; and arithmetic logic for calculating position data utilizing said position information and an integral parameter that is calculated during manufacture of said disk drive to provide a substantially exact positioning of said read/write head on said storage medium.

11. The disk drive of claim 10, further comprising storage means that holds said integral parameter and provides said integral parameter to said arithmetic logic when requested.

12. The disk drive of claim 11, wherein further said integral parameter has a corresponding offset constant that is calculated during manufacturing of said disk drive and summed with said integral parameter by said arithmetic logic when calculating said substantially exact position.

13. The disk drive of claim 12, further comprising correction means for setting said integral parameter in accordance with a calculation accuracy of said arithmetic means and correcting the calculation made by said arithmetic means.

14. The disk drive of claim 13, further comprising:

seeking-error detection means for detecting that a seek operation of moving said recording/reproducing means to a target position in accordance with a result of the calculation made by said arithmetic means has failed; and reset means for setting said integral parameter again when failure of said seek operation is detected by said seeking-error detection means.

15. The disk drive of claim 14, wherein said integral parameter is a parameter utilized for adjusting a DC bias current that is supplied to the VCM to hold the position of the read/write head in a particular track.

16. The disk drive of claim 15, further comprising:

track-seeking control that moves the read/write head to said target track; and track-following control that enables said read-write head to follow said target track.

17. The disk drive of claim 16, further comprising program code for calculating a target track, target sector, and data area from a specified LBA.

18. A disk-drive controller for controlling operation of a disk drive equipped with a disk storage medium having a servo area on which a servo sector is recorded and a data area on which a data sector is recorded and a read/write head, said disk drive controller comprising:

drive means for driving a position of said recording/reproducing means;

position detection means for extracting position information indicating the position of said recording/reproducing means from output of said servo sector reproduced by said recording/reproducing means;

holding means for holding an integral parameter in accordance with a position on said disk storage medium;

arithmetic means for calculating data for driving said drive means, based on said position information detected by said position detection means and said integral parameter in accordance with said position information; and correction means for setting said integral parameter in accordance with calculation accuracy of said arithmetic means and correcting the calculation made by said arithmetic means.

19. The disk drive controller of claim 18, further comprising logic for selecting a value of said integral parameter that is within a central portion of a range of possible values for said integral parameter, wherein said value of said integral parameter is limited by a calculation accuracy of said controller.

20. The disk drive controller of claim 19, wherein, when integral parameter value exceeds a predetermined dynamic range, said logic further selects an offset constant, which when summed with said integral parameter, places said integral parameter within said predetermined dynamic range.

* * * * *